United States Patent [19]

Stemme et al.

[11] 4,344,686
[45] Aug. 17, 1982

[54] PHOTOGRAPHIC CAMERA WITH STATE-OF-FOCUS INDICATION

[75] Inventors: Otto Stemme, Munich; Peter Lermann, Narring; Istvan Cocron, Munich, all of Fed. Rep. of Germany

[73] Assignee: Agfa-Gevaert Aktiengesellschaft, Leverkusen, Fed. Rep. of Germany

[21] Appl. No.: 133,127

[22] Filed: Mar. 24, 1980

Related U.S. Application Data

[63] Continuation of Ser. No. 952,264, Oct. 18, 1978, abandoned.

[30] Foreign Application Priority Data

Oct. 19, 1977 [DE] Fed. Rep. of Germany ....... 2746920

[51] Int. Cl.$^3$ .................... G03B 13/18; G03B 13/02
[52] U.S. Cl. .................................... 354/198; 354/199
[58] Field of Search .................... 354/25, 198–201, 354/219, 289; 250/201, 204; 352/140

[56] References Cited

U.S. PATENT DOCUMENTS 3,682,071  8/1972  Hosoe ............................. 354/25
3,906,389  9/1975  Matsumoto ..................... 354/254
4,117,325  9/1978  Holle et al. ..................... 354/25 X

FOREIGN PATENT DOCUMENTS 1447469 10/1968 Fed. Rep. of Germany .
2410681  9/1975 Fed. Rep. of Germany .
2455407  5/1976 Fed. Rep. of Germany .

Primary Examiner—Richard A. Wintercorn
Assistant Examiner—Thomas H. Tarcza
Attorney, Agent, or Firm—Michael J. Striker

[57] ABSTRACT

A photographic still or motion-picture camera has a viewfinder and a manually moved focus adjuster, such as a focussing ring. When the user peers into the viewfinder, there is a visible indication of the direction in which the focus adjuster should be manually moved to reduce the state-of-focus error, for example two curved illuminated errors, one pointing clockwise and the other counterclockwise, only one of which lights up to indicate the direction in which the focussing ring should be manually turned. When the state-of-focus error has been reduced to zero or a minimum, this is likewise indicated, for example because neither curved arrow is illuminated. To control the activation of the indicating elements, use can be made of components of a conventional completely automatic focussing system, but minus the adjusting motor of such system and minus superfluous motor-energization control circuitry. In this way, the user is provided a simple and unequivocal guide when manually focussing, without the cost, complexity, bulkiness and power consumption of a complete automatic focussing system including an adjusting motor and motor-energization control circuitry.

5 Claims, 1 Drawing Figure

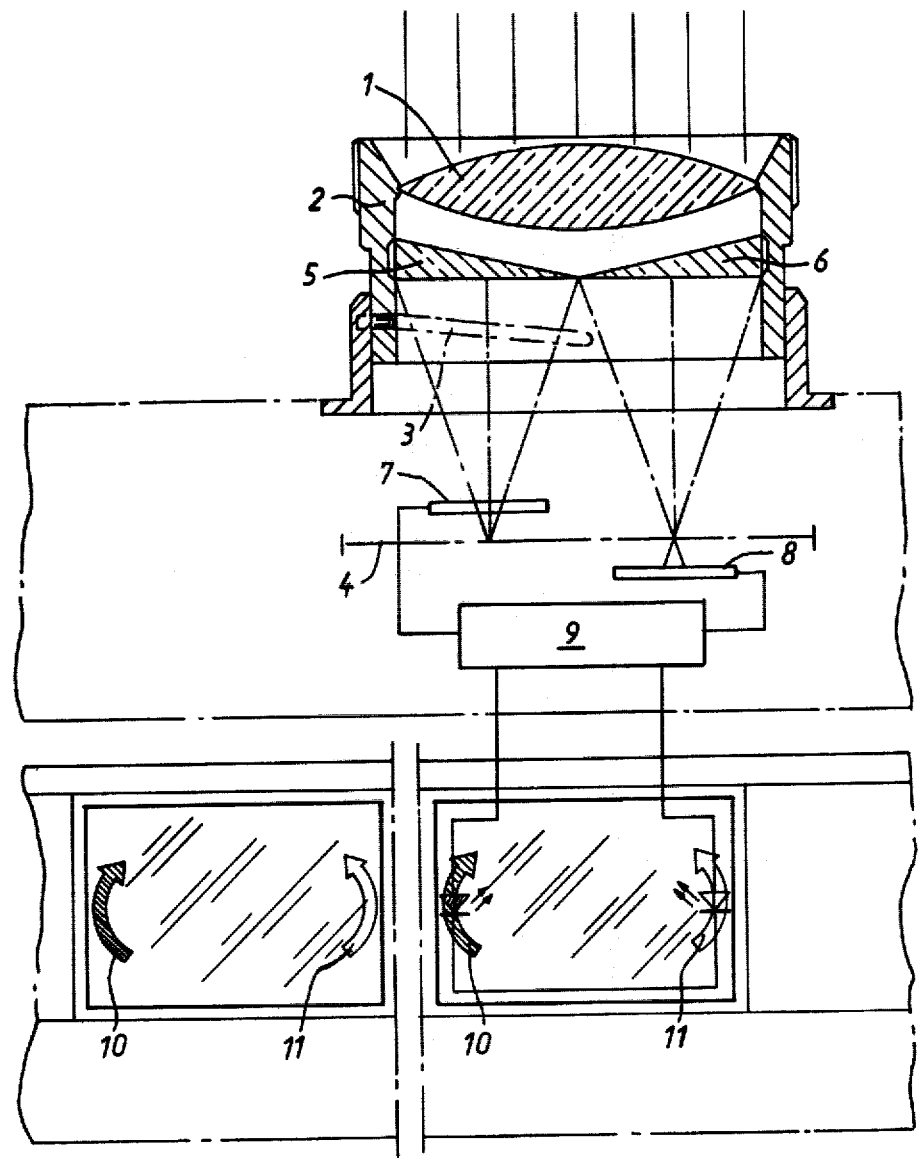

PHOTOGRAPHIC CAMERA WITH STATE-OF-FOCUS INDICATION

This is a continuation of application Ser. No. 952,264, filed Oct. 18, 1978, now abandoned.

BACKGROUND OF THE INVENTION

The present invention concerns photographic cameras provided with state-of-focus or distance-measuring means viewable in the camera viewfinder for indicating the state of focus of the camera objective relative to the subject to be filmed, and means for manually adjusting the state of focus of the camera objective.

Cameras of the type in question are widely provided in motion-picture camera form and in still-camera form. The means viewable in the camera viewfinder for indicating the state of focus of the camera may, for example, be a calibrated scale with pointer, or a double-image range finder, or in the case of reflex cameras may comprise a matte viewing screen with an embossed or otherwise formed microprism array, or may be a range finder of the split- or cut-image type, or the like.

The indicating means in the viewfinder is typically coupled to the camera's manual focus adjuster, or else operates in dependence upon adjustments performed by the photographer using the focus adjuster. Thus, for example, when the user moves a manual control, most typically turns an adjuster ring, in order to change the state of focus of the camera objective, this serves first to focus the camera and simultaneously to change the state-of-focus indication presented to the user in the camera viewfinder.

These typical state-of-focus indicators are intended to make the user's focussing task easier to perform than if no state-of-focus indicator at all were provided and the user had to rely exclusively on his own subjective awareness of image sharpness. Thus, for example, the typical split- or cut-image range finder in a reflex camera allows the user to subjectively evaluate, directly, the degree of image sharpness, but additionally provides an auxiliary form of guidance, namely that the edges of the two halves of the split image be brought into register. However, the alertness and carefulness with which the user must look at and evaluate the degree of register of the edges of the two halves of the split image are fairly considerable, so that the user's task in performing a proper focussing operation may not be much facilitated relative to performing the focussing by observing the degree of image sharpness directly. Certainly, this is particularly true in the case of users having poor vision, or users whose vision makes it uncomfortable or difficult for them to observe a small and close image in a camera viewfinder.

Furthermore, state-of-focus indicators of the types in question provide a further difficulty and inconvenience, even for example in the case of viewers with acute vision who find it comfortable to observe the small and close image in the camera viewfinder. Specifically, even if the user can clearly see that the state of focus is greatly or slightly improper, the user, even if quite knowledgeable, does not in general know in which direction the state of focus should be adjusted. For example, if as the viewer peers through the viewfinder his fingers are at the same time resting on the focussing ring of the camera, the user does not in general have any idea in which direction he actually should turn the focussing ring. As a result, the user typically picks the direction arbitrarily, with a consequent 50-50 chance that he picks the direction that will not actually worsen the state-of-focus situation. Indeed, after the first successful one of such manual adjustments, when the careful user then attempts to improve the state of focus just a little bit more, it is common that he will, once again, be unaware of the direction in which he should move the focus adjuster, so that once again he must make a 50-50 arbitrary choice of direction, followed by another manual adjustment if his first choice was the unlucky one. This is actually quite annoying, especially because many users are very careful and repeatedly try to improve the state of focus an extra little bit or else, after a completely successful focussing operation, nevertheless proceed to repeat the focussing operation anew from lack of confidence.

Of course, cameras are presently known having completely automatic focussing means, such that the user is not called upon to participate at all in the focussing operation. Completely automatic focussing means are disclosed, by way of example, in German published allowed patent applications DT-AS 1,447,469 and DT-AS 2,455,407 and in German published patent application DT-OS 2,410,681. These automatic focussing means typically include means for generating a signal indicative of the sense of the state-of-focus error, an electric motor which adjusts the state of focus of the camera, and circuit means for energizing the adjusting motor in a direction causing it to adjust the state of focus in the appropriate sense, i.e., to automatically reduce the state-of-focus error. The negative-feedback control of the operation of the electrical adjusting motor typically involves the use of motor-control circuitry in addition to the means required merely to generate a signal indicating the sense or direction of the state-of-focus error.

The self-evident drawbacks of such completely automatic focussing systems include the cost of the adjusting motor and the circuitry for controlling motor energization, the space consumed by the adjusting motor and it weight, the power drain upon the camera's battery attributable to the adjusting motor, the possibility that the adjusting motor may malfunction and require repair, and so forth. In addition, the adjusting motor will typically be coupled to the focussing mechanism of the camera through a mechanical transmission, which further adds to cost, complexity, size, weight and the possible need for repair.

SUMMARY OF THE INVENTION

Accordingly, it is the general object of the present invention to provide a camera with a focussing system of the type which the user adjusts manually, but including means facilitating the user's task to an extent overcoming all the disadvantages and inconveniences explained above.

In accordance with the broadest concept of the invention, this is accomplished by providing indicating means, preferably viewable in the camera viewfinder, providing the user with a simple and simple to interpret indication of the sense or direction of the state-of-focus error, so that the user at all times knows in what direction he should manually move the focus adjuster of the camera to achieve the proper state of focus.

The means providing this indication, besides the indicating element or elements per se, can be of the type used in completely automatic focussing systems for developing the signal indicative of the sense or direction of the state-of-focus error. For example, use can be made of an entirely conventional, completely automatic focussing system, but with the adjusting motor of the system omitted, with the motor-energization control circuitry omitted (for example, power amplifiers or logic circuits in the case of stepper-type adjusting motors, and so forth), and with of course the transmission between such adjusting motor and the camera's focussing mechanism likewise omitted. This inherently eliminates the drawbacks discussed above, and can significantly reduce cost and electrical energy consumption. All that need be used of such conventional automatic focussing system is the part thereof needed to develop a signal which indicates the sense or direction of the state-of-focus error, and then to use such signal to control an appropriate indicator.

Preferably, two indicating elements are located visible in the camera viewfinder. One lights up to indicate that the focus adjuster of the camera should be manually moved in a first direction to reduce the state-of-focus error, and the other lights up to indicate that the adjuster should be manually moved in the opposite direction or sense, i.e., depending upon whether the focal point of the camera objective, as presently set, falls in front of or behind the camera's film plane. Of course, instead of illuminatable indicating elements such as light-emitting diodes, lamps or the like, use could be made of equivalent controllable-brightness elements of the liquid-crystal type, and so forth.

The development of signals controlling the energization of the indicator(s) is not problematic. For example, if the utilized components of an automatic focussing system are of the type producing a signal which indicates the sense or direction of the state-of-focus error by means of signal polarity (positive or negative), it is merely necessary to employ a polarity discriminator to control the settings of the indicator, or the illumination of one or the other of the two indicating elements. If the utilized components of the automatic focussing system are of the type producing a signal which indicates the sense of the state-of-focus error by means of signal magnitude (e.g., above or below a certain positive voltage level), then equivalently an amplitude discriminator can be employed to control the indicator(s) of the present invention.

Most preferably, the two indicator elements very directly indicate the direction in which the user should move the focus adjuster of the camera. For example, if the camera has a conventional focussing ring, the two indicator elements can be shaped as curved arrows, respectively pointing clockwise and counterclockwise.

Clearly, the use of two dinstinguishable indications, preferably afforded by two indicator elements, to indicate the direction of the required manual adjustment is very advantageous. A related advantage is to be seen in the fact that when the correct state-of-focus has been achieved, this too will be indicated, e.g., by the fact that neither of the two curved arrows lights up. This informs the user that the focus is proper, in a way incomparably simpler for the user to immediately recognize than in the case of e.g. split-image range finders and the like.

Thus, although not particularly preferred, it would be possible to provide the user with only an indication of whether the state-of-focus is or is not correct, without informing the user of the sense of the error. While this is clearly less advantageous than the preferred indication of the sense of the error, it still would constitute a very great improvement relative, for example, to split-image range finders and the like.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE schematically depicts an exemplary embodiment of the present invention.

DESCRIPTION OF THE PREFERRED EMBODIMENT

The single FIGURE is a very schematic depiction of an exemplary embodiment of the present invention. The camera in question can be either a still camera or a motion-picture camera, and most of the components involved would actually be entirely conventional, making a more detailed illustration unnecessary.

The camera includes an objective 1 provided on a rotatable annular lens mount 2, the front outer part of which constitutes a focussing ring to be gripped and turned by the fingers of the user. In conventional manner, the focussing ring 2 is provided with a helical thread 3 or other such guide structure, so that when the focussing ring 2 is manually turned the distance of objective 1 from the camera film plane changes. Numeral 4 denotes the schematically represented reference plane of the state-of-focus evaluating means of the camera. In per se conventional manner, the objective 1 shifts in a manner correlated with the reference plane 4, and reference plane 4 is coordinated in space with the actual film plane of the camera. For example, the camera may be of the type provided with two objectives, one used to expose film, the other a viewfinder objective, the two objectives being shiftable by a single focussing ring, with the state-of-focus of the viewfinder objective being correlated with that of the exposure objective, so that the state-of-focus of the viewfinder image simulates that of the exposure which will be made on the camera's film; in that event, the illustrated objective 1 could be the viewfinder objective, in which case the reference plane 4 would not be coincident with the actual film plane. If the camera is a single-lens reflex camera, the objective 1 may be the exposure objective of the camera, with an appropriate totally or partially reflecting mirror being used to deflect the image light, or just a fraction of it, into the reference plane 4.

Two prisms 5, 6 are arranged behind the objective 1. When the state of focus is correct, the two prisms 5, 6 both focus sharp component images onto the reference plane 4. Two distinct light detectors 7, 8 are respectively located in front of and behind the reference plane 4. Light detectors 7, 8 convert the image light of the two component images into respective electrical signals whose values are dependent upon image contrast and state of focus. These signals are fed to a comparing and amplifying stage 9 which evaluates the signals and, in dependence upon the ascertained sense or direction of the state-of-focus error, illuminates one or the other of two light-emitting elements 10, 11. The light-emitting surfaces of the indicating elements 10, 11 are advantageously shaped as curved arrows, one pointing clockwise and the other counterclockwise. Alternatively, of course, other light sources, for example positioned behind openings of curved-arrow shape or the like, could equivalently be provided.

Components 1-9 can be part of a conventional automatic focussing system, e.g., such as disclosed in German published allowed patent applications DT-AS 1,447,469 and DT-AS 2,455,407 or in German published patent application DT-OS 2,410,681, the disclosures of which are incorporated herein by reference. However, the adjusting motor of such system is omitted, plus also any motor-control circuitry superfluous for the purposes of the present invention. If the components 1-9 are taken from a system which produces a state-of-focus error signal that indicates the sense of the error by means of, for example, signal polarity or level, then stage 9 can include a polarity or level discriminator, i.e., in order to select the appropriate one of the two elements 10, 11 for illumination.

In the illustrated embodiment, the two curved-arrow shaped indicating elements 10, 11 are spatially arranged such that the left one 10 lights up when the user should manually turn focussing ring clockwise, whereas the right one 11 lights up when the user should manually turn the focussing ring counterclockwise. This provides the most direct possible indication of the direction in which the focussing ring should be manually turned. Furthermore, when the state-of-focus error has been reduced to zero, or to the minimum response limit of the system, both curved-arrow indicators 10, 11 go dark, unequivocally informing the user that there is nothing further for him to do. At the lower left in the FIGURE, the right, counterclockwise-pointing indicator 11 is shown illuminated, this indicating to the user that the focussing ring 2 should be manually turned counterclockwise.

The curved indicating elements 10, 11 are to be understood to be either light-emitting diodes whose light-emitting surfaces have the illustrated shape or, equivalently, liquid-crystal elements, e.g., positioned in front of light sources or merely in the path of incoming viewfinder light, or the like. Likewise, the curved-arrow indicating elements could be replaced by other, less graphically configured elements, such as two light-emitting elements of different color, and so forth. One advantageous possibility in the case of liquid-crystal indicator elements is to provide appropriately shaped (e.g. curved-arrow shaped) transparent electrodes on a liquid-crystal sandwich structure also provided with further transparent electrodes for the use of the same liquid-crystal sandwich structure to additionally indicate other functions or parameters of interest, e.g., exposure time, aperture size, and so forth.

It is advantageous to physically locate the indicating elements in an intermediate image plane, if one is available. For example, motion-picture cameras with complicated viewfinder systems usually include two intermediate image planes. In the case of reflex still cameras, it will usually be only the matte image plate plane which affords a suitable location. In the case of cameras provided, for example, with Albada viewfinders, the reflective surface responsible for projecting the illuminated-frame image into the viewfinder provides a good plane for location of the indicating elements. With conventional Newton viewfinders, the image of the curved arrows can be reflected into the viewfinder image from the sides of the viewfinder system; in the simplest case, the curved arrows can be located in the vicinity of the front lens, even through here no sharp image of the arrows is possible.

It will be understood that the concept of the present invention is not limited to the specific type of distance-measuring or state-of-focus evaluating means described above, e.g., of the type involving split images and twin light detectors. The invention would be equally applicable when the state-of-focus evaluating means is of the type used in so-called active focussing systems, e.g., of the type wherein radiation is projected from the camera towards the subject, and the radiation reflected back to the camera is evaluated with respect to subject-distance, and so forth. With all such systems, components will be provided suitable for development of the indicator-control signals needed here, because the system will anyway develop such a signal for motor-energization control or as a preliminary thereto, and the signal already developed may often be utilizable, with little modification or processing, for the purposes of the present invention.

Furthermore, while the concept of the present invention evidently makes it possible to eliminate the cost and other drawbacks of the adjusting motor of a completely automatic focussing system—that being its main advantage—the indicating technique of the present invention could, if desired, be provided as a back-up in a camera provided with a completely automatic focussing arrangement. However, it is emphasized that the preferred use of the present invention is in a camera not provided with an automatic focussing arrangement, and in particular not provided with an adjusting motor capable of automatically adjusting the state of focus.

Also, while the technique of the present invention is incomparably superior to more conventional aids to manual focussing, such as split-image range finders and so forth, such as to really make such conventional aids superfluous, they could of course be used in conjunction with the present invention, if for any reason desired.

It will be understood that each of the elements described above, or two or more together, may also find a useful application in other types of circuits and constructions differing from the types described above.

While the invention has been illustrated and described as embodied in a particular system for visually displaying the state-of-focus error, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. An improved system for facilitating manual focussing of a camera objective in a manner that an image of a photographic subject is sharply focussed on a reference plane, the system utilizing displays located in a camera viewfinder in order to inform a user as to a direction in which the objective is to be rotated in order to focus the image, comprising:

a splitter located intermediate the objective and the reference plane, the splitter splitting the image into first and second parts;

a first light detector located in front of the reference plane between the reference plane and the splitter and being aligned with the first part, the first light detector generating a first electrical signal characteristic of light intensity of the first part at the first light detector;

a second light detector located behind the reference plane and being aligned with the second part, the second light detector generating a second electrical signal characteristic of light intensity of the second part at the second light detector;

a first display located in the camera viewfinder, the first display being shaped into an arrow pointing clockwise;

a second display located in the camera viewfinder, the second display being shaped into an arrow pointing counterclockwise; and a comparator responding to the electrical signals and being connected to the displays so as to cause the first display to be energized when the objective must be rotated manually clockwise as viewed by a user in order to focus the image on the reference plane and so as to cause the second display to be energized when the objective must be manually rotated counterclockwise as viewed by a user in order to focus the image on the reference plane.

2. The system defined in claim 1, wherein the splitter includes two prisms located symmetrically about a central axis of the objective.

3. The system defined in claim 2, wherein the first and second displays are liquid crystal elements.

4. The system defined in claim 2, wherein the first and second displays are light-emitting diodes.

5. The system defined in claim 1, wherein the reference plane is a film plane in the camera.

* * * * *